(12) United States Patent
Galante

(10) Patent No.: US 9,150,235 B2
(45) Date of Patent: Oct. 6, 2015

(54) INSULATED COOLER WITH POLE RECEIVING CHANNEL

(71) Applicant: Michael Galante, Oakdale, NY (US)

(72) Inventor: Michael Galante, Oakdale, NY (US)

(*) Notice: Subject to any disclaimer, the term of this patent is extended or adjusted under 35 U.S.C. 154(b) by 0 days.

(21) Appl. No.: 14/027,318

(22) Filed: Sep. 16, 2013

(65) Prior Publication Data

US 2014/0077467 A1    Mar. 20, 2014

Related U.S. Application Data

(60) Provisional application No. 61/703,456, filed on Sep. 20, 2012.

(51) Int. Cl.
| | |
|---|---|
| *B62B 1/00* | (2006.01) |
| *B62B 5/00* | (2006.01) |
| *F25D 3/08* | (2006.01) |
| *B62B 1/12* | (2006.01) |
| *A45C 11/20* | (2006.01) |
| *B62B 5/06* | (2006.01) |

(52) U.S. Cl.
CPC .............. *B62B 5/0013* (2013.01); *B62B 1/12* (2013.01); *B62B 5/00* (2013.01); *F25D 3/08* (2013.01); *A45B 2200/1054* (2013.01); *A45C 11/20* (2013.01); *B62B 5/067* (2013.01); *B62B 2202/52* (2013.01); *B62B 2204/06* (2013.01)

(58) Field of Classification Search
USPC .................... 280/47.34; 220/475; 248/156
See application file for complete search history.

(56) References Cited

U.S. PATENT DOCUMENTS

| | | | |
|---|---|---|---|
| 6,536,733 | B1 | 3/2003 | Sharp |
| 6,796,319 | B1 | 9/2004 | Patarra et al. |
| 7,143,601 | B1 | 12/2006 | Jimenez |
| 8,181,811 | B1 * | 5/2012 | Blake ........................... 220/475 |
| 2001/0013358 | A1 | 8/2001 | Patarra |
| 2001/0054433 | A1 * | 12/2001 | Patarra ........................... 135/16 |
| 2011/0056233 | A1 | 3/2011 | Flaker et al. |

* cited by examiner

*Primary Examiner* — John Walters
*Assistant Examiner* — James Triggs
(74) *Attorney, Agent, or Firm* — Daniel Boudwin; Global Intellectual Property Agency, LLC

(57) ABSTRACT

The present invention relates to an insulated cooler that is configured for the reception of an umbrella therein. The cooler comprises upper and lower surfaces that house two internal compartments and a central section separating the compartments. The central section comprises a central channel that extends from the upper section to the lower section of the cooler, whereby the central channel is configured to receive an umbrella pole therethrough. Moreover, the doors of the cooler surface comprise half-moon cutouts that enable the doors of the cooler to open and close without becoming obstructed by an umbrella secured within the central channel. The insulated cooler enables users to easily transport food and beverages across sand or gravel using attached wheels, and eliminates the problem of an umbrella blowing away.

6 Claims, 4 Drawing Sheets

INSULATED COOLER WITH POLE RECEIVING CHANNEL

CROSS REFERENCE TO RELATED APPLICATION

This application claims the benefit of U.S. Provisional Application No. 61/703,456 filed on Sep. 20, 2012, entitled "Umbrella Cooler". The above identified patent application is herein incorporated by reference in its entirety to provide continuity of disclosure.

BACKGROUND OF THE INVENTION

1. Field of the Invention

The present invention relates to coolers. More specifically, the invention relates to a cooler that includes an umbrella stand mounted thereto, whereby the umbrella mount provides a user with a location to place and maintain an upstanding umbrella.

The beach is often a very relaxing place to visit in the summertime. The combination of the ocean, beach, and the sun bring many people out for vacation or just a day out with the family. However, spending too much time outdoors in direct sunlight is not healthy for one's skin, and people who remain out in the sun for long periods of time may develop issues such as sunburn, heat exhaustion and skin cancer risk.

Knowing all of these concerns, many people attempt to stay cool while on the beach by staying in the shade. Traditionally, users attempt to protect themselves from sun exposure by mounting umbrellas in the sand, which consist of a canopy that is mounted on an upstanding pole. These beach-mountable umbrellas typically resemble conventional umbrellas; however, the poles are modified for insertion into the sand, whereby the pole includes a hollow or a pointed end. Moreover, some of these umbrellas comprise hinged portions that facilitate the angling of the canopy in order to provide shade during the changing sun positioning.

While traditional umbrellas are suitable during situations where there are not many disturbances to the beach sand, these umbrellas have limitations when used in windy weather and in unsupportive sand. In these situations, the umbrella can easily become displaced and lean at an undesired angle. Traditional solutions to these situations include inserting the umbrella pole further into the sand or to configure a way to weigh the umbrella pole down. However, it is quickly discovered that these solutions have their limitations, whereby further insertion of the pole results in having the canopy closer to the sand surface, and the pole often lacks weight bearing structures configured to keep the pole stationary. In order to overcome these setbacks of traditional umbrellas, instead of altering the umbrella, other items that have been brought to the beach have instead been modified in order to add stability to a beach umbrella.

There are several devices in the prior art that attempt to provide stabilization of an umbrella pole while inserted within the beach sand. Some of these devices attempt to provide stabilization by mounting the pole on a beach cooler. These devices either mount the umbrella on the sides of the cooler with brackets or provide an aperture through the center of the cooler for the insertion of an umbrella pole; however, none of these prior art devices address the need for a cooler that provides stability of an umbrella while providing an umbrella-receiving tube that facilitates an additional level of stability by the closure of the pair of hinged doors around the umbrella pole.

The present invention relates to a new and improved cooler that is configured for the reception of an umbrella pole centrally therein. The cooler resembles a traditional cooler, whereby the cooler includes an insulated interior compartment, oversized wheels adapted for use on sand, a handle, and insulating doors; however the cooler of the present invention differs from the prior art coolers, whereby the cooler includes a central aperture adapted for receiving an umbrella pole, and further includes hinged doors that include umbrella pole cutouts adapted for securing around the umbrella positioned within the aperture of the cooler. The present invention facilitates the securement of an umbrella pole by utilizing the weight of a cooler and its contents. Moreover, the insertion tube of the cooler extends from the upper surface to the lower surface, whereby the umbrella pole is capable of extending through the cooler and into the sand in order to provide enhanced stability compared to that of an unsupported umbrella.

2. Description of the Prior Art

Devices have been disclosed in the prior art that relate to umbrella holders. These include devices that have been patented and published in patent application publications. These devices generally relate to devices comprising exterior attachments onto which an umbrella may be mounted. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Pat. No. 6,536,733 to Sharp, which discloses a cooler with an umbrella attachment configured for supporting an umbrella thereon, whereby the umbrella attachment mechanism includes two hinged rings which are adapted receiving an umbrella pole. The attachment rings may be positioned on the back of the cooler or within a cutout from the back of the cooler. However, while the cooler of Sharp comprises an umbrella pole receiving aperture, it differs from the present invention in that it fails to provide an aperture in the center of the cooler.

Another such device, U.S. Pat. No. 7,143,601 to Jimenez, teaches a cooler and umbrella assembly, whereby the cooler includes a tube on a corner of the cooler for the reception of an umbrella therein. The cooler further comprises a radio, compact disc player, speakers and an bottle opener which provide the cooler with multiple forms of entertainment, whereas the present invention is directed towards a device for holding an umbrella within the center of the cooler instead of directed towards providing a party atmosphere.

U.S. Patent Publication No. 2011/0056233 to Flaker describes a recreational cooler, whereby the cooler includes a hollow accessory shaft that extends completely through the cooler from an upper surface to a lower surface. The cooler accessory shaft is sized to receive accessories which may include that of umbrellas, fishing poles, tables, cooking stands, chairs, and basketball stands. The upper surface of the cooler includes multiple hinged compartments, whereby the hinges are positioned near the center of the upper surface. Such hinged positioning teaches away from that of the present invention, whereas the hinges of the present invention are positioned around the perimeter of the cooler, and the hinged doors further comprise cutouts adapted for the reception of an umbrella pole.

Another device, U.S. Pat. No. 6,796,319 to Patarra, discloses a portable cooler with an umbrella, whereby the cooler comprises an umbrella stand located at the wheeled end of the cooler. The wheeled end of the cooler comprises a U-shaped cutout through which the mast of the umbrella is passed through to facilitate stability.

Finally, another device by Patarra, U.S. Patent Publication No. 2001/0013358, describes a cooler with an umbrella mounting means. The mounting means comprises an aperture which extends through the upper surface of the cooler and terminates in an opening in the lower surface of the cooler. The umbrella pole is inserted through the upper surface and extends therethrough until an engaging end within the cooler, thereby holding the umbrella in an upright position. Thereafter an extension member may be attached to the underside of the cooler and inserted into the sand surface in order to provide additional securement.

The embodiments of Patarra disclose devices which facilitate the stability of an umbrella in a beach environment whereby the umbrella is secured within a cooler in either a central location along the cooler or on a side or end portion thereof. While the devices of Patarra may facilitate the task of securing an umbrella in a similar manner as that of the present invention, the prior art is structurally different in that Patarra fails to provide a pair of doors that further secure the umbrella pole when closed therearound. The umbrella pole is positioned within a central aperture in the cooler central portion that extends through both the upper and lower surface of the cooler, which enables the umbrella pole to further be inserted into the sand surface if desired.

The present invention relates to a cooler that is configured for securing an umbrella therein, whereby the cooler includes an aperture that extends therethrough in order to provide additional stability for the umbrella when within the unstable sand. The cooler resembles a conventional cooler in that it includes enlarged wheels, a handle, and surfaces which enclose an insulated interior. However, the present invention further comprises a pair of doors which comprise hinges at the perimeter along the width of the cooler, whereby the doors open at the centerline of the cooler. The doors each further comprise a half-moon shaped cutout, which is adapted to surround an umbrella pole in order to provide additional stability. Overall, the device of the present invention enables a user to secure an umbrella in the sand while shielding a cooler from the sun.

It is submitted that the present invention is substantially divergent in design elements from the prior art and consequently it is clear that there is a need in the art for an improvement to existing umbrella securement devices. In this regard the instant invention substantially fulfills these needs.

SUMMARY OF THE INVENTION

In view of the foregoing disadvantages inherent in the known types of umbrella securing coolers now present in the prior art, the present invention provides a new device wherein the same can be utilized for providing convenience for the user when desiring to secure an umbrella within a central portion of a cooler.

It is therefore an object of the present invention to provide a new and improved umbrella mounting cooler device that has all of the advantages of the prior art and none of the disadvantages.

It is another object of the present invention to provide a cooler having a central aperture, whereby the aperture is configured for reception of an umbrella.

Another object of the present invention is to provide a cooler having a central aperture and a pair of doors having cutouts which overlap said aperture for additional lateral support thereof and for uninterrupted closure of the cooler doors.

Yet another object of the present invention is to provide a cooler having an aperture which extends from an upper surface to a lower surface, whereby an umbrella pole extends therethrough and is capable of penetrating through the sand surface.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
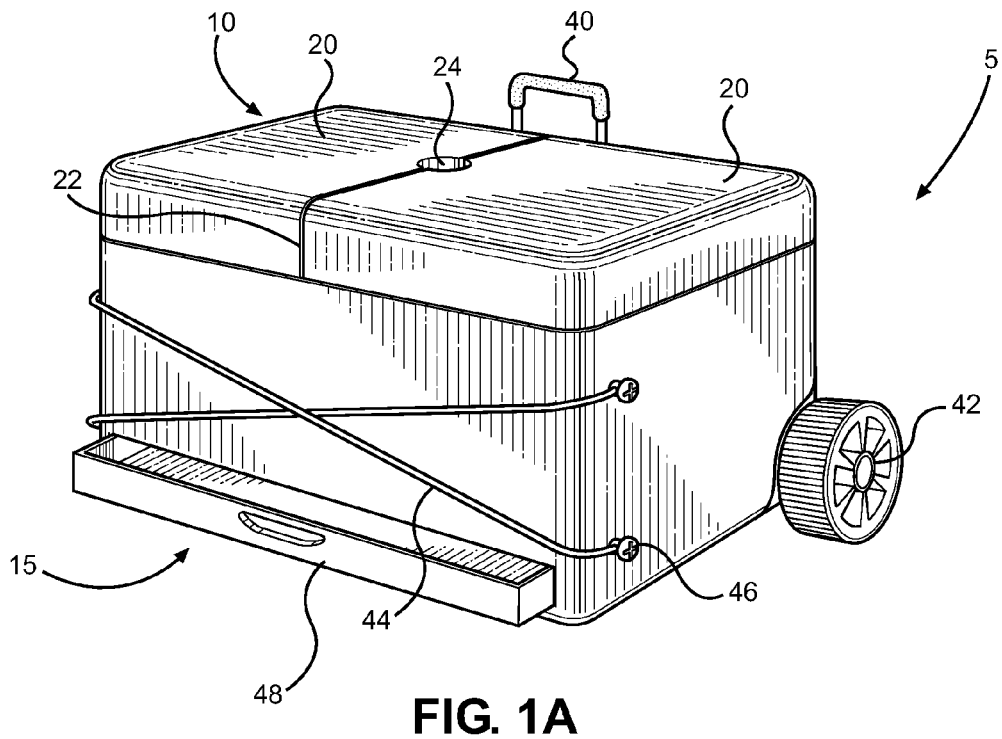
FIG. 1A shows a perspective view of the cooler of the present invention.

Reference is made herein to the attached drawings. Like reference numerals are used throughout the drawings to depict like or similar elements of the umbrella pole receiving cooler. For the purposes of presenting a brief and clear description of the present invention, the preferred embodiment will be discussed as used for providing a cooler having a central channel therein for the reception of an umbrella pole therethrough. The figures are intended for representative purposes only and should not be considered to be limiting in any respect.

Figure 1B:
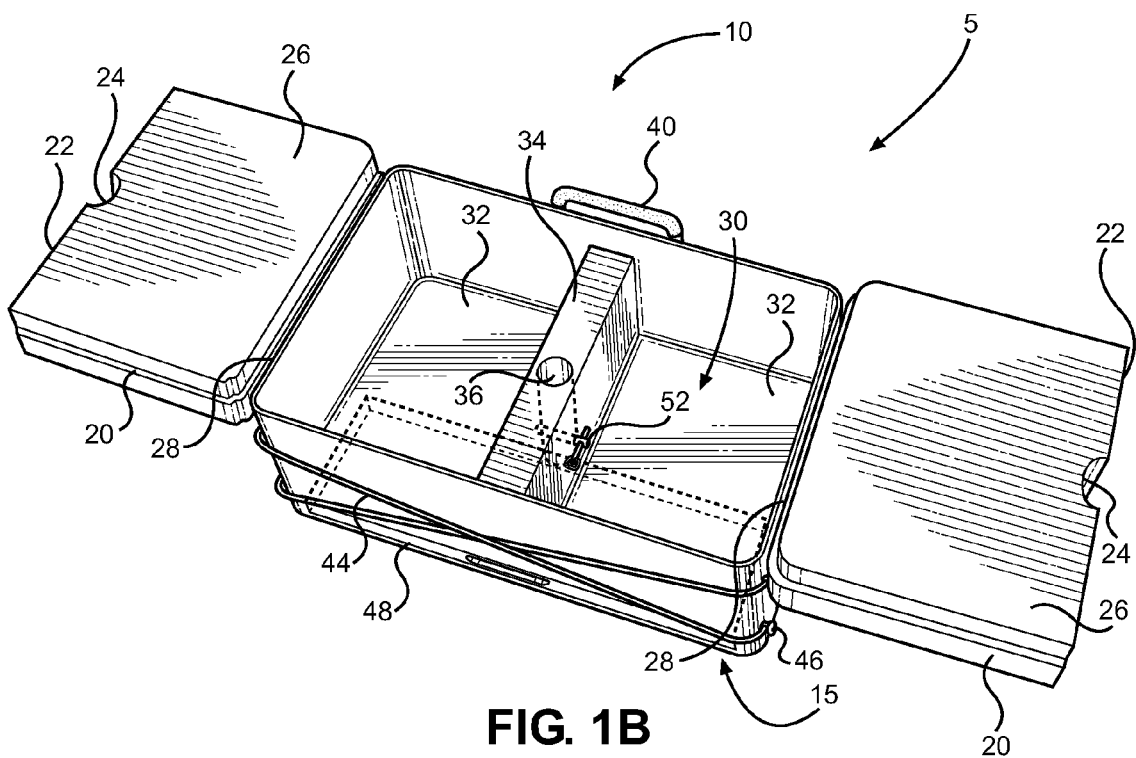
FIG. 1B shows an overhead perspective view of the present invention, whereby the cooler doors are open.
Figure 1C:
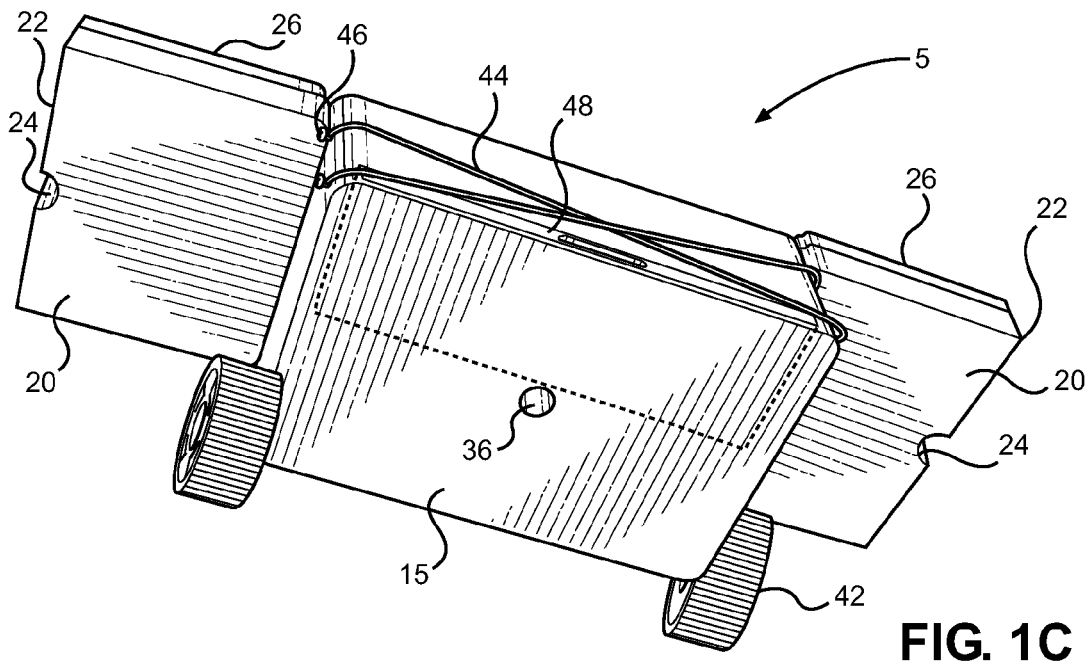
FIG. 1C shows an underside view of the present invention.

Referring now to FIGS. 1A through 1C, there are shown perspective and underside views of the cooler of the present invention, whereby FIG. 1A shows a perspective view of the cooler having closed doors 20, FIG. 1B shows a perspective view having open doors 20, and FIG. 1C shows an underside view of the cooler of the present invention.

In reference to FIG. 1A, there is shown a perspective view of the cooler 5 of the present invention. The cooler 5 resembles a traditional cooler, whereby the device includes a rectangular shape, an insulated interior 30, a telescoping handle 40, and oversized wheels 42. The present invention, however, further includes securing straps 44, a bottom shelf 48 configured for the placement of items thereon, and an interior channel extending from the upper surface 10 of the cooler to the lower surface 15 thereof.

The upper surface 10 of the cooler is split into left and right halves by the central channel 34, whereby each half comprises a separate door 20 that seals a cooler half. Each door 20 comprises a mating edge (see 22 in FIG. 1B), having a cutout 24 that abuts against the mating edge and cutout of the opposing door. The cutouts 24 are half-moon shaped and when mated with the opposing door, form a circle that is concentric with, and overlaps the channel 36 within the cooler interior.

Referring now to FIG. 1B, there is shown a perspective view of the cooler 5 of the present invention in an open configuration. FIG. 1B displays the cooler having open doors 20, a handle 40, exterior article retention cords 44 having fasteners 46, a bottom shelf 48, and an insulated interior 30. The interior 30 is separated into left and right sections 32 by a central section 34, the central section 34 having an elongated channel 36 disposed vertically therethrough. The channel 36 starts from an upper surface 10 of the cooler, which includes the hinged doors 20, and extends therethrough to the underside 15 of the cooler. The hinges 28 of the cooler doors 20 are positioned along the outer sides of the cooler width, whereby the mating edges 22 of the doors 20 abut against one another along the center line of the cooler when the doors are closed. The channel 36 extends through a center point of the cooler 5, thereby providing a central location for the placement of a pole shaped object therein (see 50 in FIG. 2). The central section 34 includes an aperture and a locking screw 52, whereby the aperture extends through each side of the central channel 34. The locking screw 52 is configured for placement therethrough, thereby locking in place objects placed within the channel 34. However, if the locking screw 52 is not placed within the aperture, a plug may be placed therein to retain the desired temperature within the cooler 5. A shelf 48 extends a short distance within the lower surface 15 of the cooler 5 and is utilized in combination with the retention cords 44 to retain objects thereon. The length of the shelf 48 does not extend beyond a midpoint along the cooler 5, thereby preventing contact with the channel 36 that extends through the cooler 5.

The interior compartments 32 are adapted to contain food, beverages, and other items therein, whereby the compartments 32 are insulated and configured for keeping the interior 30 cold for long periods of time. The structure of the cooler walls is adapted to take the form of most standard cooler structures in the art and provide an insulated interior. The separated compartments 32 are completely isolated from each other and enable a user to stock the compartments 32 with different items at different temperatures depending on the amount of temperature controlling devices within the compartments. Moreover, each door 20 includes a projection 26 that facilitates an increase in the insulation of the interior of the cooler 30, whereby the projections 26 extend into the compartment and to seal the same.

Referring now to FIG. 1C, there is shown an underside 15 view of the cooler of the present invention, whereby the view illustrates the enlarged wheels 42 and through-hole channel 36 of the cooler. The wheels 42 are of a larger diameter than traditional cooler wheels, whereby the wheels 42 are adapted for traversing beach sand. Moreover, the wheels include treads which are configured for facilitating the rotation of the wheels along the sand surface.

The channel 36 extends through the center of both the upper 10 and lower surfaces 15 of the cooler 5, whereby the channel 36 is configured for the reception of a pole-shaped object therein. In the preferred embodiment the channel 36 is configured for the reception of an umbrella pole. However, it is contemplated that the channel of the cooler is capable of receiving other pole-shaped objects therein, including that of volleyball net poles, canopy poles, or objects containing similar shaped poles which are sized to fit therein.

Figure 2:
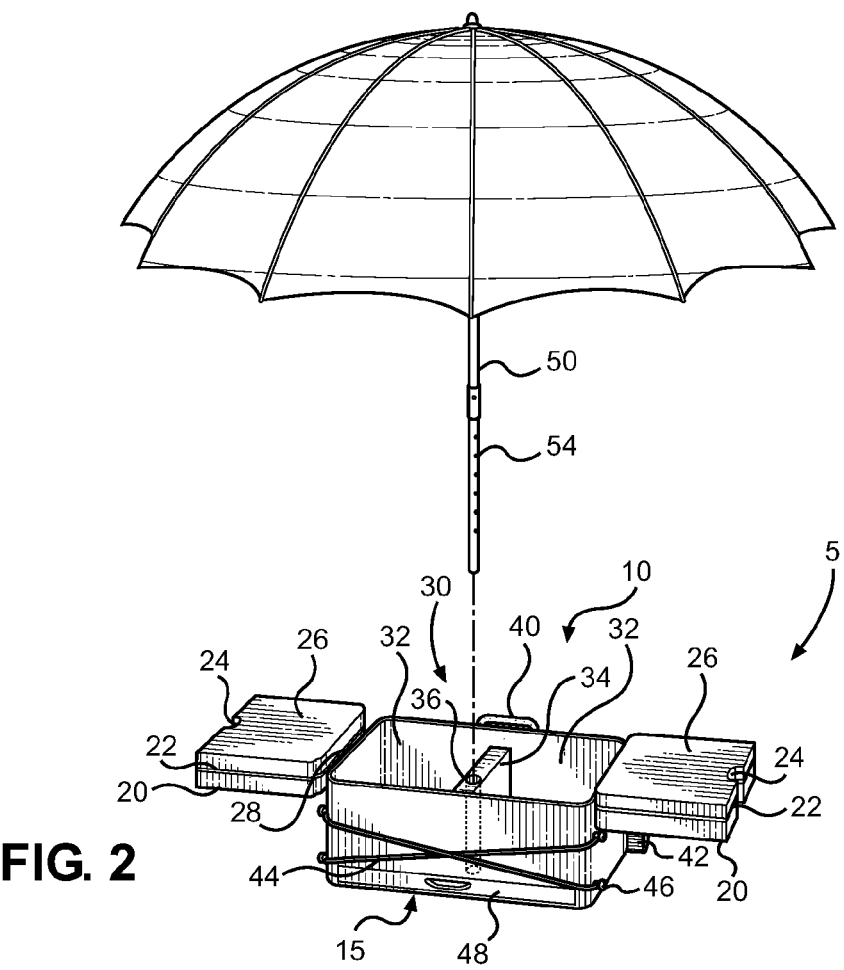
FIG. 2 shows a view of the present invention, whereby the umbrella reception channel extends through the cooler.

Referring now to FIG. 2, there is shown a view of the present invention, whereby the reception channel 36 extends through the cooler 5. The cooler 5 includes an upper surface 10 having left and right hinged doors 20, a lower surface 15, left and right compartments 32, a central section 34, and a channel 36 extending through the upper 10 and lower 15 surfaces of the cooler 5.

In a preferred embodiment, the cooler 5 of the present invention is adapted for the reception of a beach style umbrella 50; however it is contemplated that conventional umbrellas which fit within the channel are suitable for reception within the channel. As shown, the channel 36 is built into the central section 34 which separates the cooler into left and right compartments 32. The central section 34 includes a channel 36 which extends from the upper surface 10 to the lower surface 15. An umbrella 50 is insertable into the channel 36 in order to facilitate increased stability of the umbrella on the beach sand, whereby the umbrella is provided a stabilizing barrier within the channel 36. The umbrella 50 may include a series of apertures 54 extending along the length of the pole, whereby the apertures 54 are configured for the reception of a locking screw (52, see FIG. 1B) that secures the umbrella in place within the cooler 5. Moreover the contents within the cooler compartments 32 add a level of weighted stability, which reduces unwanted movements of the umbrella 50 during periods of high wind.

Figure 3A:
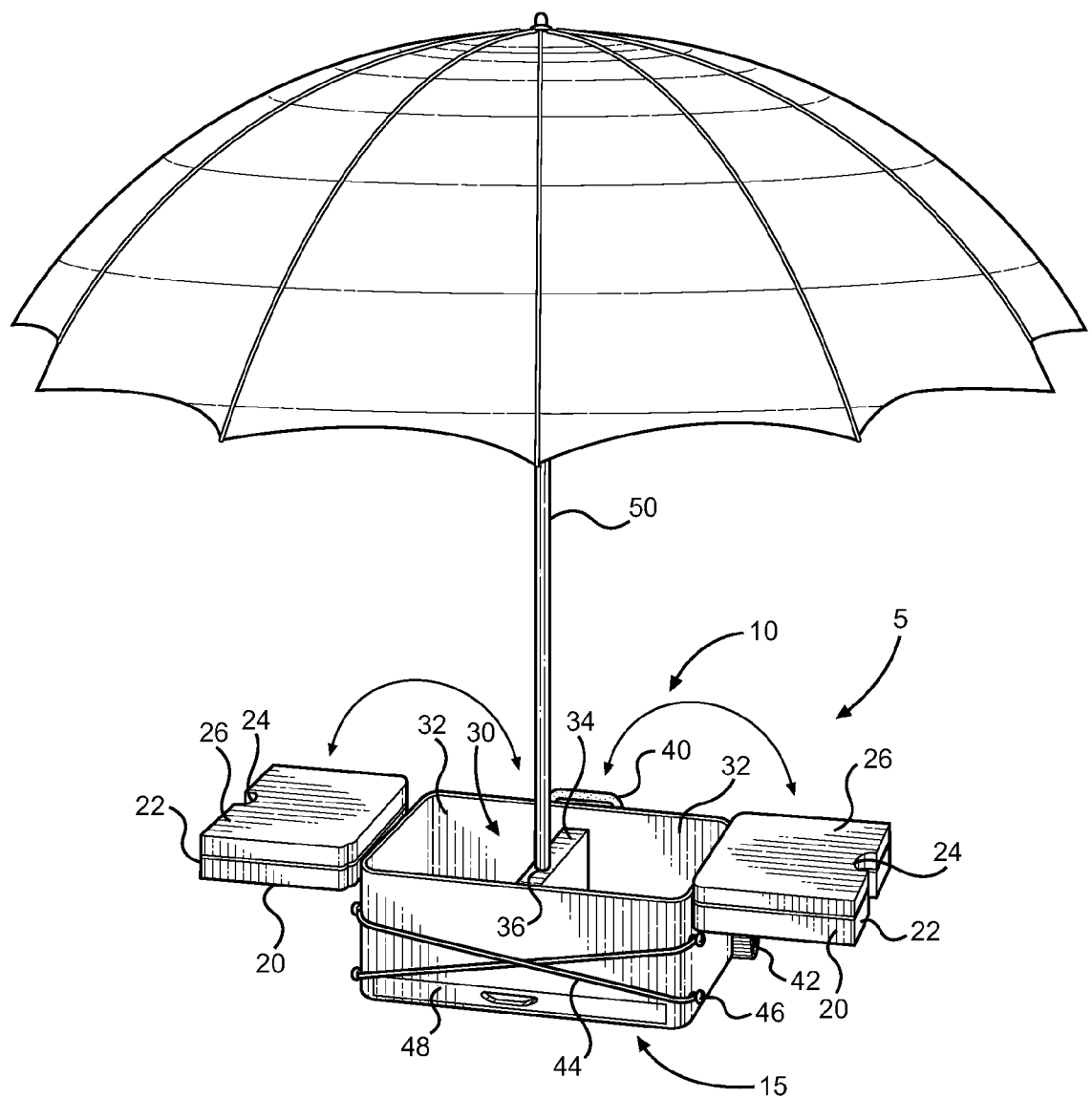
FIG. 3A shows a perspective view of the umbrella within the cooler, whereby the cooler doors are open and the umbrella pole is being supported.
Figure 3B:
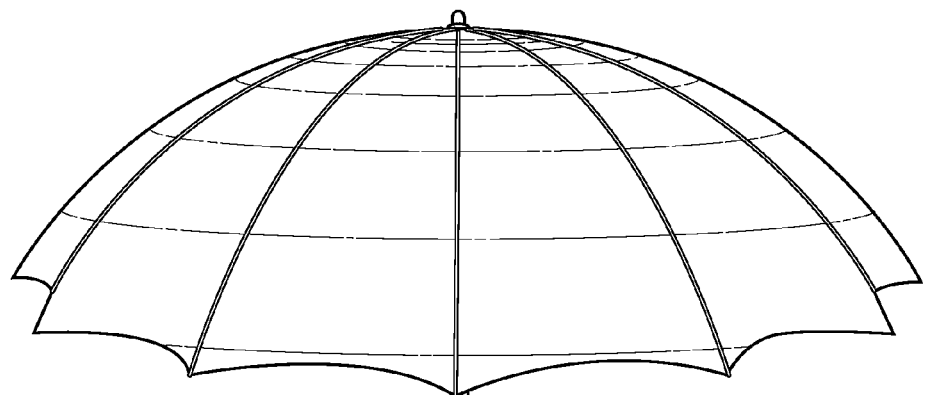
FIG. 3B shows a perspective view of the umbrella within the cooler, whereby the cooler doors are closed and the assembly is in a working state.

Referring now to FIGS. 3A and 3B, there are shown open and closed door perspective views of the cooler having an umbrella therein, whereby FIG. 3A comprises an open door configuration, and FIG. 3B comprises an alternative embodiment having closed door configuration.

In reference to FIG. 3A, there is shown the preferred embodiment of the present invention, whereby the cooler doors 20 have an open orientation. The doors each include hinges 28, projections 26, edges 22, and cutouts 24, whereby the doors open outwardly from the central section as illustrated by arrows. The central section 34 includes a receiving channel 36 which is adapted for the reception of an umbrella 50. Moreover, each door 20 comprises a half-moon shaped cutout 24 which coincide with a portion of the channel 36, thereby enabling an umbrella 50 to be inserted within the cooler 5 whether the doors 20 are opened or closed. The projections 26 of the doors extend within the compartments 32 in order to facilitate further insulation of the interior 30, whereby the projections 26 also include cutouts 24 which coincide with the umbrella receiving channel 36 of the cooler. These cutouts 24 coincide with the channel 36 of the central section 34, however, the width of the central section 34 ensures that the cooler remains fully insulated regardless of the diameter of the device inserted within the receiving channel 36. The edges 22 of the doors 20 each rest on a half of the central section 34 and provide insulation through the left and right compartments 32 therein.

Referring now to FIG. 3B, there is shown an alternative embodiment of the present invention, whereby the left and right doors 20 are closed. The doors 20 and compartments 32 of the cooler 5 are divided lengthwise along the cooler, thus providing an alternative embodiment with compartments which are longer in length. Moreover, it is contemplated that the handle 40 and enlarged wheels 42 may be installed along the length or width of the cooler. Furthermore, the cooler may comprise a more circular, squared, other polygonal shape which is suitable for insulating contents therein.

Figure 4:
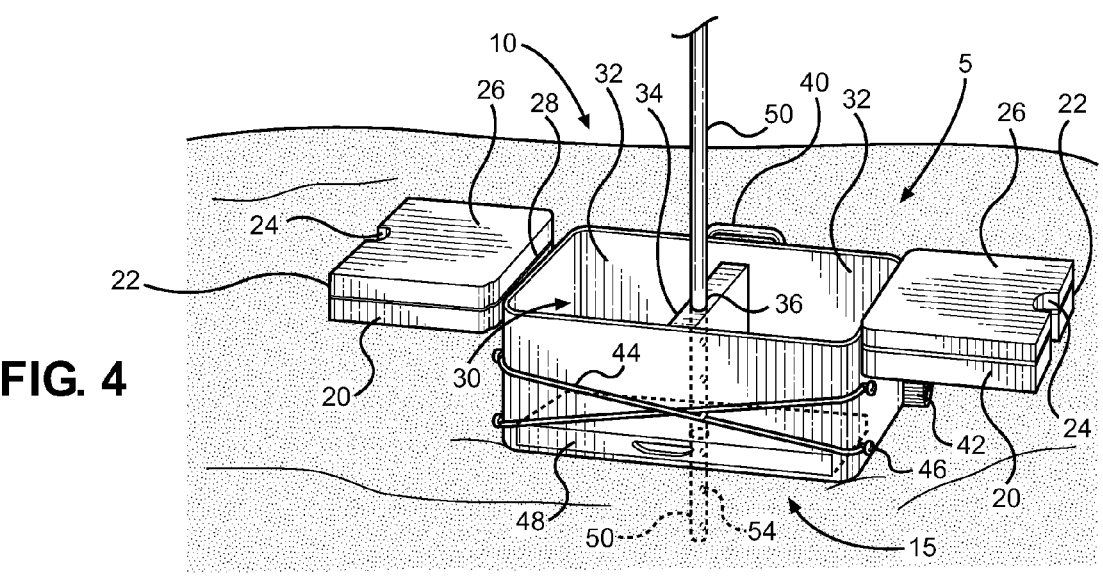
FIG. 4 shows the present invention in use, whereby the umbrella pole is inserted within the reception channel and the pole extends into the sand.

Referring now to FIG. 4, there is shown the present invention while in use, whereby an umbrella 50 is inserted into the channel 36 and extends therethrough and into the sand. The channel 36 of the central section 34 extends from the upper surface 10 of the cooler to a lower surface 15 thereof. The channel 36 is configured for the reception of the pole of an umbrella 50 therein, whereby the umbrella is capable of extending through both the upper 10 and lower surfaces 15 of the cooler 5 and thereafter being inserted into the sand. The insertion of the umbrella 50 through the cooler 5 and into the sand provides an increased level of protection against displacement, whereby a gust of wind or human interaction must overcome the weight of the cooler, in addition to the forces holding the umbrella within the sand to displace the umbrella. Furthermore, the cooler 5 or its internal compartments may comprise a more square or rectangular alternative designs. Moreover, the cooler may comprise larger or smaller sizes to suit the storage or transportation needs of the user.

The present invention provides a cooler 5, whereby the cooler includes upper 10 and lower sections 15, hinged doors 20, and a central section 34 which separates the interior 30 of the cooler into left and right compartments 32. The upper section 15 includes a pair of hinged doors 20, whereby the doors 20 are hinged 28 at positions along a side of the perimeter thereof in order to enable the doors to close along a central axis of the cooler. The doors each include projections 26 and edges 22 which comprise a half-moon shaped cutout 24 configured to coincide with a channel 36 that extends through the central section 34. The central section 34 separates the left and right chambers 32 and includes a channel therein 36, whereby the channel 36 extends from an upper surface 10 of the cooler to a lower surface 15 therebelow. The central section 34 has a generally rectangular width which facilitates a connection between the edges 22 of the doors 20, whereby the door projections 26 rest upon the surface of the central section 34 when the doors 20 are closed. Moreover, the cutouts 24 of the edges 22 align with a half of the channel 36 of the central section 34 in order to provide unobstructed closure of the doors, whereby an umbrella 50 placed within the central channel 36 fits within both the channel 36 and the cutouts 24 of the cooler 5.

Furthermore, the cooler includes retention cords 44 having fasteners 46, a bottom shelf 48, a handle 40, and enlarged wheels 42. The retention cords 44 are configured for retaining objects therein, or by attached thereon by hooks. The cords 44 comprise inelastic or elastic bands which are attached to the side of the cooler by fasteners 46, whereby the cables 44 cross each other and are secured at upper 10 and lower 15 positions along the cooler 5. The bottom shelf 48 extends out a short distance from the exterior of the cooler 5. Items may be placed on the shelf 48 and secured within the retention cords 44 to provide a secure attachment onto the exterior of the cooler, thereby keeping the items out of the sand. Alternatively it is contemplated that the exterior of the cooler 5 can comprise a netting configured for holding contents therein for the purpose of keeping the contents within the netting above the beach sand. The handle 40 of the cooler 5 comprises a telescoping mechanism, which facilitates the transportation of the cooler, whereby the handle is extendible when in use and retractable when stationary. The enlarged wheels are attached to the lower exterior of the cooler, whereby the wheels 42 can be attached along the width or the length of the cooler. The wheels are enlarged in order to facilitate the transportation of the cooler through beach sand, and further comprises treads that facilitate rotation of the wheels.

Overall, the present invention relates to an insulated cooler 5 which is configured for the reception of an umbrella therein. The cooler 5 comprises a set of interior compartments 32 which are separated by a central section 34 having a channel 36 extending therethrough. The doors 20 of the cooler 5 include cutouts 24 which are adapted to coincide with the channel 36 of the central section 34, whereby the cutouts 24 enable the doors 20 to be shut without contacting an umbrella 50 positioned within the central channel 36. The doors 20 further include projections 26 which facilitate the insulation of the interior 30 when the doors 20 are closed. The central channel 36 extends from an upper surface 10 of the cooler and extends therethrough until the lower surface 15 of the cooler 5. An umbrella 50 positioned within the central channel 36 is capable of extending therethrough and exiting the channel. The umbrella 50 is then capable of being inserted directly into the sand, whereby the umbrella is secured within the sand and is further stabilized within the central channel 36 of the cooler. In this way, the present invention provides an insulated cooler 5 which comprises a channel 36 that is configured for the reception of an umbrella 50, in order to prevent the loss of an umbrella caused by wind or unstable sand.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An insulated cooler, comprising:
   a lower surface and upstanding sidewalls forming an internal volume;
   a first and second door each having a first edge attached to said upstanding sidewalls at a hinge joint, whereby said first and second doors each comprise a mating surface disposed along a second edge of each door that is opposite of said first edge;
   said mating surfaces adapted to abut one another;
   a pair of aligned cutouts along said mating surfaces that are adapted to form a through-hole through said first and second door when said first and second door are in a closed position and said mating surfaces are abutted against one another;
   a central section separating said internal volume into a first and second compartment;
   a central channel extending through said central section and through said lower surface;
   whereby said through-hole aligns with said central channel for reception of a pole therethrough;
   said first and second door adapted to independently seal said first and second compartment, respectively when in a closed position;
   a shelf disposed through at least one of said upstanding sidewalls, said shelf being adapted to slidably extend outwards from one of said upstanding sidewalls along an exterior of the insulated cooler, and furthermore be slidably received within said internal volume of said insulated cooler without interfering with said central channel.

2. The insulated cooler of claim 1, wherein said hinge joints are positioned along opposing portions of said upstanding sidewall.

3. The insulated cooler of claim 1, further comprising a first and second rotatably supported roller wheel.

4. The insulated cooler of claim 1, further comprising an extendable handle attached to said upstanding sidewall.

5. The insulated cooler of claim 1, further comprising at least one exterior securing strap and accompanying securing strap fasteners, whereby said securing strap is adapted to support articles exteriorly along said upstanding sidewall.

6. The insulated cooler of claim 1, further comprising an aperture extending through said central section and said central channel, whereby a locking screw is configured to extend therethrough to secure objects placed within said central channel.

* * * * *